United States Patent
Colombi et al.

(10) Patent No.: US 9,160,202 B2
(45) Date of Patent: Oct. 13, 2015

(54) CONTROL SYSTEM FOR UNINTERRUPTIBLE POWER SUPPLIES

(75) Inventors: Silvio Colombi, Ticino (CH); Andrea Lauro Delmuè, Ticino (CH); Lorenzo Giuntini, Ticino (CH)

(73) Assignee: General Electric Company, Schenectady, NY (US)

(*) Notice: Subject to any disclaimer, the term of this patent is extended or adjusted under 35 U.S.C. 154(b) by 798 days.

(21) Appl. No.: 13/363,178

(22) Filed: Jan. 31, 2012

(65) Prior Publication Data

US 2013/0193760 A1   Aug. 1, 2013

(51) Int. Cl.
H02J 7/00 (2006.01)
H02J 9/06 (2006.01)
H02J 3/00 (2006.01)

(52) U.S. Cl.
CPC ............... *H02J 9/062* (2013.01); *H02J 3/006* (2013.01); *H02J 9/061* (2013.01); *Y10T 307/615* (2015.04)

(58) Field of Classification Search
USPC .......................................................... 307/64
See application file for complete search history.

(56) References Cited

U.S. PATENT DOCUMENTS

| | | |
|---|---|---|
| 3,999,077 A | 12/1976 | Borkovitz et al. |
| 4,748,341 A | 5/1988 | Gupta |
| 5,210,685 A | 5/1993 | Rosa |
| 5,315,533 A | 5/1994 | Stich et al. |
| 5,745,355 A | 4/1998 | Tracy et al. |
| 6,292,379 B1 | 9/2001 | Edevold et al. |
| 6,295,215 B1 | 9/2001 | Faria et al. |
| 6,304,006 B1 | 10/2001 | Jungreis |
| 6,330,174 B1 | 12/2001 | Yeah |
| 6,404,075 B1 | 6/2002 | Potter et al. |
| 6,556,459 B2 | 4/2003 | Okui et al. |
| 6,691,248 B1 | 2/2004 | Nishijima et al. |
| 6,906,933 B2 | 6/2005 | Taimela |
| 7,050,312 B2 | 5/2006 | Tracy et al. |
| 7,061,141 B2 | 6/2006 | Yamamoto |
| 7,239,043 B2 | 7/2007 | Taimela et al. |
| 7,265,458 B2 | 9/2007 | Edelen et al. |
| 7,372,177 B2 | 5/2008 | Colombi et al. |
| 7,400,066 B2 | 7/2008 | Tassitino, Jr. et al. |
| 7,403,368 B2 | 7/2008 | Johnson, Jr. |
| 7,508,094 B2 | 3/2009 | Johnson, Jr. et al. |

OTHER PUBLICATIONS http://powerquality.eaton.com/About-Us/News-Events/2009/PRO51009.asp; Date: Oct. 5, 2009 Eaton's Energy Saver System Enables UPSs to Deliver Industry-leading Efficiency without Compromising Reliability.

*Primary Examiner* — Rexford Barnie
*Assistant Examiner* — Dru Parries
(74) *Attorney, Agent, or Firm* — Fletcher Yoder, P.C.

(57) ABSTRACT

Systems and methods for controlling uninterruptible power supplies (UPSs) are provided. In one example, a system may include an inverter feed path to supply a first amount of power to a load and a bypass feed path to supply a second amount of power to the load. A controller may generate command the inverter feed path and the bypass feed path to vary the first amount of power and the second amount of power based at least in part on an occurrence of a power supply disturbance and a type or severity, or both, of the power supply disturbance.

18 Claims, 11 Drawing Sheets

CONTROL SYSTEM FOR UNINTERRUPTIBLE POWER SUPPLIES

BACKGROUND OF THE DISCLOSURE

The presently disclosed subject matter relates to control of uninterruptible power supplies (UPSs).

An uninterruptible power supply (UPS) is an electrical device that can supply power to a load despite variations in quality and/or availability of utility-based power. One common type of UPS is a double-conversion UPS. A double-conversion UPS receives power from a utility power grid, converts the utility power from alternating current (AC) to direct current (DC) in a rectifier, and stores at least some of this power in an energy storage device. An inverter changes the DC power from the rectifier and/or the energy storage device into an AC power waveform. The AC power waveform may be supplied to the load.

Because multiple-conversion operation is inefficient, many UPS devices can operate in an alternative mode to reduce inefficiencies. In a power-saving mode termed "eco-mode," power to the load is supplied primarily through a bypass from the utility to the load. In this power-saving mode, power is supplied via double-conversion only upon a power supply disturbance from utility. While such a power-saving mode may be more efficient, when such disturbances to the utility power supply occur, they could disrupt power to the load. In many UPS applications, however, even a temporary disruption may be unacceptable.

BRIEF DESCRIPTION

Certain embodiments commensurate in scope with the originally claimed invention are summarized below. These embodiments are not intended to limit the scope of the claims, but rather these embodiments are intended only to provide a brief summary of possible forms of the disclosure. Indeed, the disclosure may encompass a variety of forms that may be similar to or different from the embodiments set forth below.

In a first embodiment, a system includes an inverter feed path to supply a first amount of power to a load and a bypass feed path to supply a second amount of power to the load. A controller may generate command the inverter feed path and the bypass feed path to vary the first amount of power and the second amount of power based at least in part on an occurrence of a power supply disturbance and a type or severity, or both, of the power supply disturbance.

In a second embodiment, an article of manufacture includes one or more tangible, machine-readable media at least collectively comprising machine-executable instructions. The instructions include instructions to run a disturbance analyzer component of an uninterruptible power supply control system to determine when at least one of at least two types of power supply disturbances occurs in the uninterruptible power supply and instructions to cause one or more bypass feed paths or one or more inverter feed paths to primarily supply power through the uninterruptible power supply depending on whether the at least one of the at least two types of power supply disturbances has occurred in the uninterruptible power supply. The instructions also include instructions to run a transient control component of the uninterruptible power supply control system to control a transient modality by which a transition from supplying power from the one or more bypass feed paths to the one or more inverter feed paths or from the one or more bypass feed paths to the one or more inverter feed paths occurs when such a transition occurs.

In a third embodiment, a method includes supplying power to a load through a bypass feed path of an uninterruptible power supply and ascertaining that a first power supply disturbance or that a second power supply disturbance is occurring in the uninterruptible power supply. When the first power supply disturbance is occurring, the power may be transitioned to being supplied to the load through an inverter feed path according to a first modality. When the second power supply disturbance is occurring, the power may be transitioned to being supplied to the load through an inverter feed path according to a second modality.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
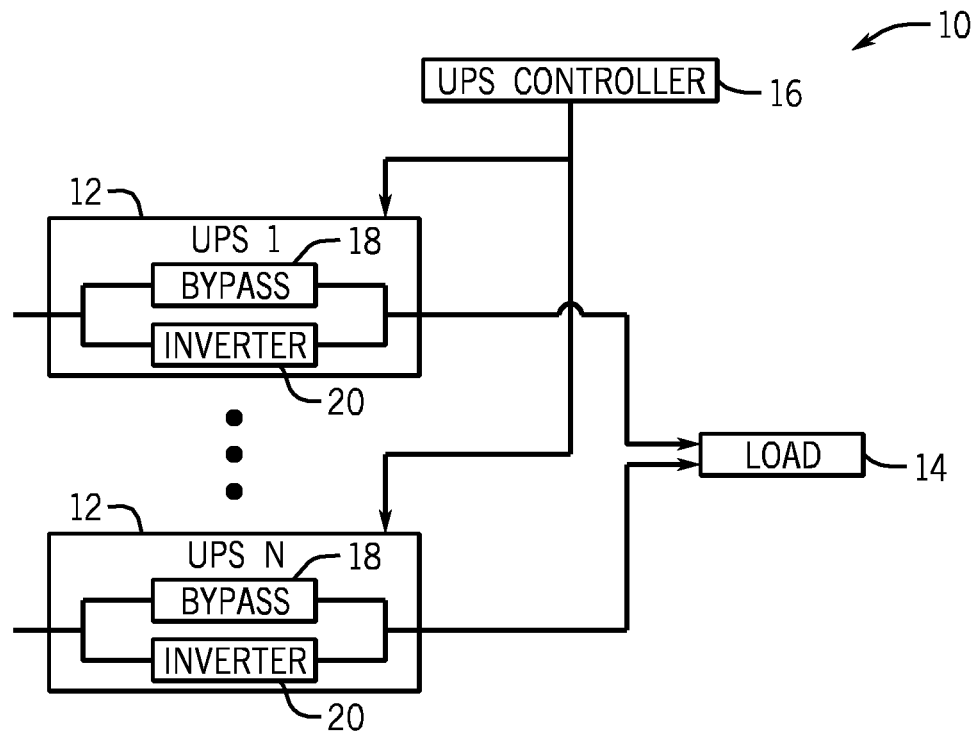
FIG. 1 is a block diagram of a system of parallel-operation uninterruptible power supplies (UPSs) controlled to reduce disruption of power to a load while operating at a relatively high efficiency, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than those listed.

The present disclosure relates to controlling one or more uninterruptible power supplies (UPSs) to efficiently determine whether and how to transfer between supplying power through double-conversion or a bypass. As mentioned above, a UPS may provide power to a load while protecting the load from supply disturbances. When a UPS operates in double-conversion mode, in which alternating current (AC) power is first converted to direct current (DC) before being reconverted back to AC, the UPS may provide excellent protection but limited efficiency. The present disclosure will describe a manner of UPS control with greater efficiency that can also achieve excellent protection.

In general, supplying power through a bypass feed path of a UPS may be more efficient, and supplying power through a double-conversion inverter feed path of the UPS may provide more protection from power supply disturbances. To provide both excellent protection and high efficiency (e.g., around 99% efficiency), the present disclosure teaches a manner controlling the UPS system to variably supply power from the bypass feed path or the double-conversion inverter feed path depending on the presence and/or severity of any power supply disturbances. To this end, a UPS controller may analyze power flowing through the UPS for power supply disturbances. Such disturbances may include, for example, an instantaneous voltage error, a root mean squared (RMS) voltage error, an output short-circuit, a static switch module (SSM) failure in the bypass feed path, a missing input phase, and/or a neutral current.

By default, the UPS controller may cause power to be supplied mainly through the bypass feed path of the UPS. The UPS controller may cause a transition to the double-conversion inverter feed path when certain power supply disturbances are detected. Depending on the type and/or severity of the power supply disturbance, the UPS controller may vary the way the transition occurs. Many examples of such transitions will be discussed below. To provide one example, a more severe instantaneous voltage error may result in a more rapid transition from the bypass feed path to the double-conversion inverter feed path. Such UPS control may be used with a single UPS or multiple UPSs in parallel.

One example of a parallel UPS system 10 that can provide both excellent protection and high efficiency appears in FIG. 1. The parallel UPS system 10 includes any suitable number of uninterruptible power supplies (UPSs) 12, here labeled 1 . . . N, which may feed power to a load 14. One or more UPS controllers 16 may control the operation of the UPSs 12 in the manner described below. Although the example of FIG. 1 illustrates a single UPS controller 16 that may control all of the UPSs 12 of the parallel UPS system 10, other configurations may be employed. For example, each UPS 12 may rely on its own UPS controller 16, which may coordinate with other UPS controllers 16 in any suitable fashion (e.g., peer-to-peer or master-slave).

Among other things, the UPS controller 16 may determine and control when each UPS 12 supplies power to the load 14 by way of a bypass feed path 18 or an inverter feed path 20. The bypass feed path 18 of each UPS 12 represents power supplied from some main power source, such as a power utility or local generator. In contrast, the inverter feed path 20 represents a double-conversion path in which alternating current (AC) power is first converted to direct current (DC) before being converted again to AC power using an inverter. In the example of FIG. 1, the inverter feed path 20 receives power from the same source as the bypass feed path 18. It should be appreciated, however, that the inverter feed path 20 may alternatively receive input power from a different power source. For instance, the bypass feed path 18 may receive power from a utility power grid and the inverter feed path 20 may receive power from a local generator. The inverter feed path 20 will generally provide a higher-quality source of power that is resistant to disturbances from the power grid. Supplying power through the inverter feed path 20, however, will introduce some inefficiencies due to power conversion. As such, supplying power through the inverter feed path 20 may be less efficient than supplying power through the bypass feed path 18.

The UPS controller 16 may therefore control the bypass feed path 18 to supply power to the load 14 as a default. Thereafter, when certain power supply disturbances occur, the UPS controller 16 may cause at once all of the UPSs 12 to transition from supplying power via bypass feed paths 18 to supplying power via inverter feed paths 20. The manner of the transition may vary depending on the type and/or severity of the power supply disturbance. When the power supply disturbance is no longer occurring (and/or is not expected to occur for some period of time in the future), the UPS controller 16 may cause the UPS 12 to transition from the inverter feed path 20 back to the bypass feed path 18 in a gradual way.

Figure 2:
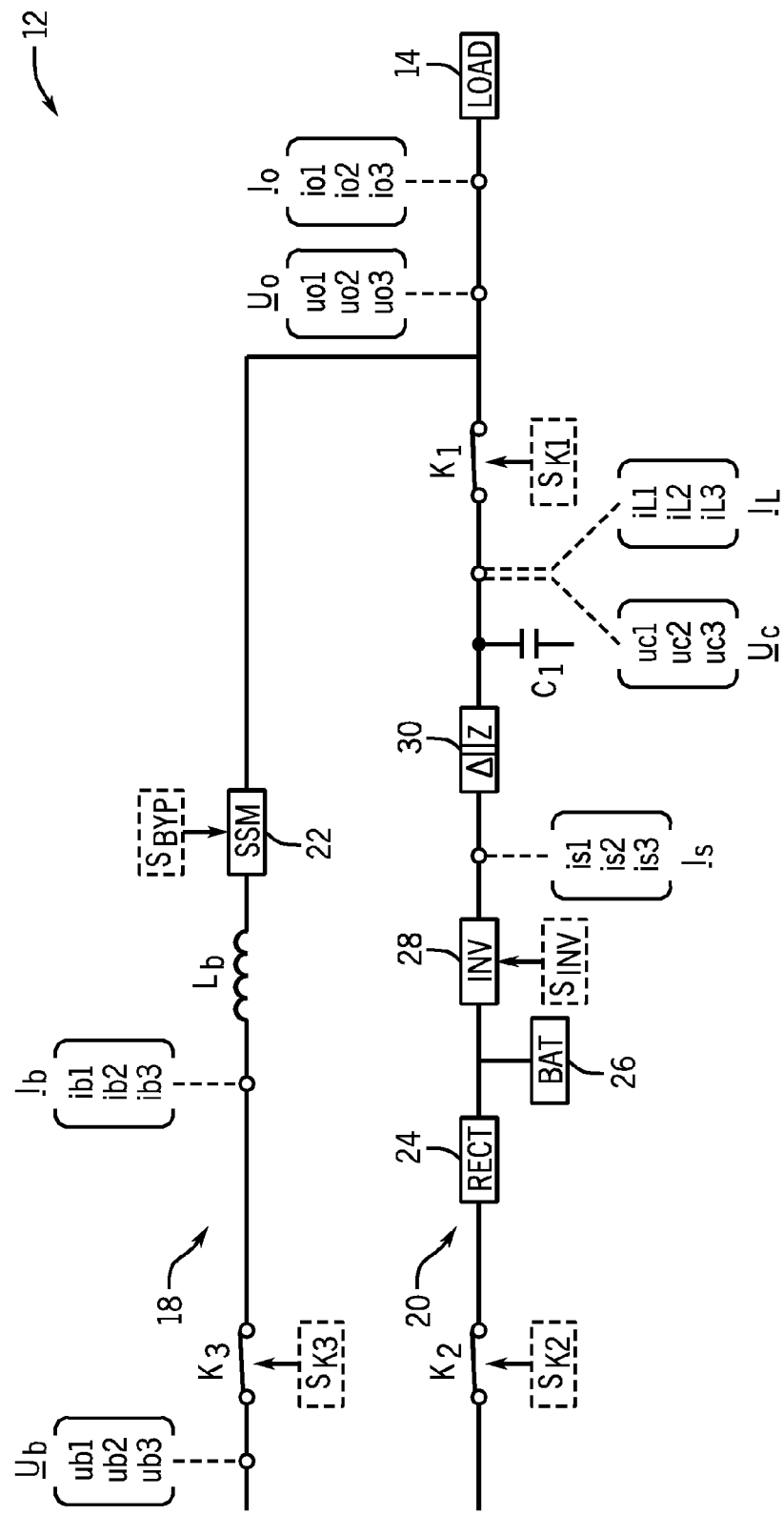
FIG. 2 is a block diagram representing control sensor measurements and control signals associated with a UPS in the system of FIG. 1, in accordance with an embodiment.

To control each UPS 12, the UPS controller 16 may receive electrical measurements at various points within the UPS 12 and provide several control signals to components of the UPS 12. Some of these signals are shown in a block diagram of a UPS 12 illustrated in FIG. 2. In the example of FIG. 2, a block diagram of a UPS 12 is shown in one-line form. That is, each line of the block diagram of FIG. 2 represents three phases of power (and/or a neutral line). As also can be seen in FIG. 2, the UPS 12 includes a bypass feed path 18 and an inverter feed path 20.

Referring first to the bypass feed path 18, a contactor or switch $k_3$ provides power from the power source through the bypass feed path 18 when closed. A control signal $S_{K3}$ from the UPS controller 16 may control whether the contactor or switch $K_3$ is open or closed. In general, the contactor or switch $K_2$ remains closed even when the bypass feed path 18 is not selected to provide power to the load 14. An inductor $L_b$ serves as a choke in each UPS 12. The presence of the inductor $L_b$ in the bypass feed path 18 may permit accurate electrical measurements in the bypass feed path 18 even when connected in parallel with other UPSs 12. As shown in FIG. 2, voltage measurements ($U_b$) and current measurements ($I_b$) of the bypass feed path 18 may be measured before the inductor $L_b$. Without the inductor $L_b$, a failure (e.g., a short circuit) in a different parallel bypass feed path 18 could immediately impact the measurements of the bypass feed path 18 shown in FIG. 2. Thus, when a failure occurs in one of multiple parallel bypass feed paths 18, the inductor $L_b$ may allow the UPS controller 16 to distinguish which of the multiple parallel bypass feed paths 18 has failed. A static switch module (SSM) 22 in the bypass feed path 18 may act as a switch controlled by the UPS controller 16 (e.g., via a control signal $S_{BYP}$). As should be appreciated, the SSM 22 may be formed from cost- and power-efficient thyristors. The UPS controller 16 may control whether the bypass feed path 18 supplies power to the load 14 by toggling the SSM via the control signal $S_{BYP}$.

The inverter feed path 20 may receive power through a contactor or switch $K_2$. The UPS controller 16 may control the contactor or switch $K_2$ via a control signal $S_{K2}$. In general, the contactor or switch $K_2$ will remain closed even when the inverter feed path 20 is not selected to provide power to the load 14. Three-phase power passing through the inverter feed path 20 may enter a rectifier 24. The rectifier 24 converts alternating current (AC) power into direct current (DC) power. The DC power output by the rectifier 24 may be stored in a battery 26 or any other suitable energy storage device. When the inverter feed path 20 supplies power to the load 14, an inverter 28 may reconvert the DC power from the rectifier 24 and/or the battery 26 back to AC power based on inverter control signals $S_{INV}$. The UPS controller 16 may control whether the inverter feed path 20 supplies power to the load 14 based on the inverter control signals $S_{INV}$ the inverter 28 receives (or does not receive).

The AC power output by the inverter 28 may enter an output isolation transformer 30 before reaching one or more banks of filtering capacitors $C_1$. A contactor or switch $K_1$, controlled via a control signal $S_{k1}$, generally may remain closed. Indeed, in certain modes of operation, the contactor or switch $K_1$ may remain closed even when the load 14 is being supplied by the bypass feed path 18 and the inverter 28 is not active. As a result, some power from the bypass feed path 18 may flow back into the inverter feed path 20 through the contactor or switch $K_1$, thereby keeping the transformer 30 magnetized. By keeping the transformer 30 magnetized while the bypass feed path 18 is supplying power to the load 14, the inverter feed path 20 may be able to rapidly transition to supply power to the load 14. That is, the UPS controller 16 may quickly activate the inverter 28 without waiting for the transformer 30 to become magnetized.

As discussed above, the controller 16 may receive several electrical measurements of the UPS 12. For example, voltage measurements ($U_b$) and current measurements ($I_b$) of the bypass feed path 18 may be measured before the inductor $L_b$. In the inverter feed path 20, output currents ($I_s$) from the inverter 28 are sensed between the inverter 28 and the output isolation transformer 30. Additionally, capacitor voltage ($U_c$) and inverter load current ($I_L$) may be measured before the contactor or switch $K_1$. Finally, at the output of the UPS 12, amounting to the combination of power from the bypass feed path 18 and the inverter feed path 20, output voltage ($U_o$) and output current ($I_o$) may be measured. It should be understood that these measurements are provided by example and that more or fewer measurements may be obtained. To provide one brief example, in certain embodiments, measurements related to current through the banks of filtering capacitors $C_1$ may be obtained.

Figure 3:
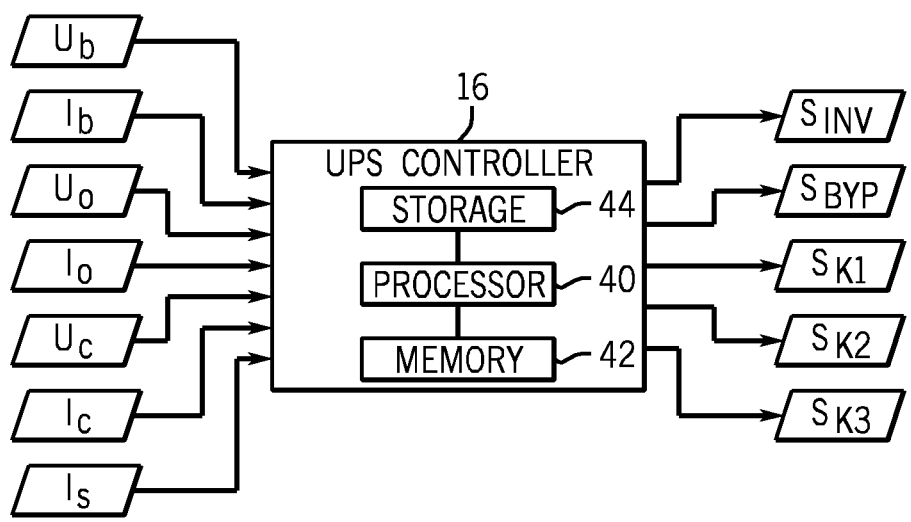
FIG. 3 is a block diagram of a controller for the UPS of FIG. 2, in accordance with an embodiment.

As seen in FIG. 3, the UPS controller 16 may receive these measurements $U_b$, $I_b$, $U_o$, $I_o$, $U_c$, $I_L$, and $I_s$. Using these measurements, the UPS controller 16 may determine and/or output the UPS 12 control signals $S_{INV}$, $S_{BYP}$, $S_{K1}$, $S_{K2}$, and $S_{K3}$. To determine the control signals, the UPS controller 16 may employ a processor 40 operably coupled to memory 42 and/or storage 44. The processor 40 and/or other data processing circuitry may carry out instructions stored on any suitable article of manufacture having one or more tangible, machine-readable media at least collectively storing such instructions. The memory 42 and/or storage 44 may represent such articles of manufacture. Among other things, the memory 42 and/or the storage 44 may represent random-access memory, read-only memory, rewriteable memory, a hard drive, or optical discs. Additionally or alternatively, the UPS controller 16 may include a field programmable gate array (FPGA) or an application-specific integrated circuit (ASIC) that has been programmed to carry out the techniques discussed herein or to support the processor 40 (e.g., by assisting in communication).

Figure 4:
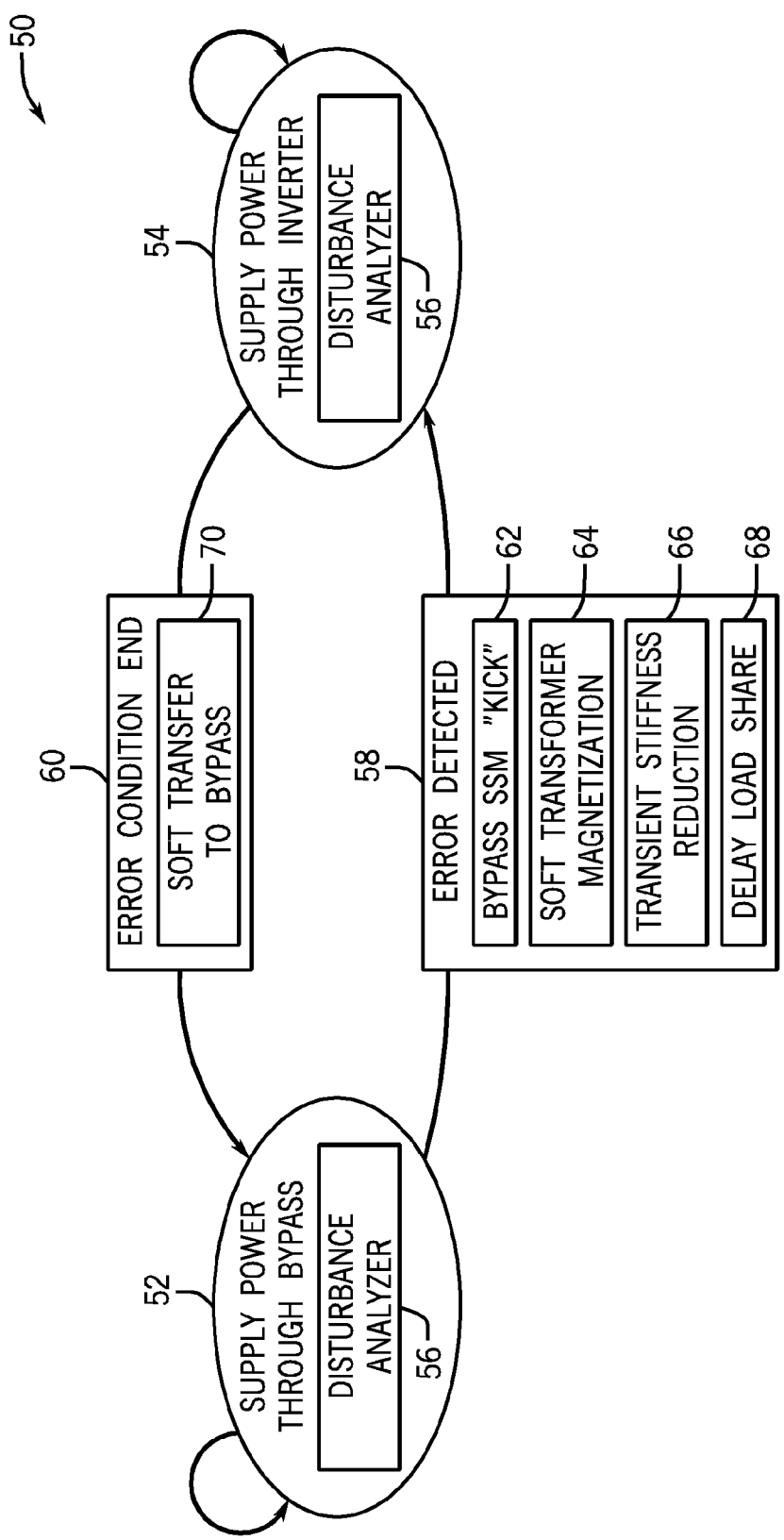
FIG. 4 is a block diagram of a state machine carried out by the controller of FIG. 3 to reduce disruptions to the load power supply while operating at relatively high efficiency, in accordance with an embodiment.

The UPS controller 16 may carry out a control system 50, an example of which appears in FIG. 4. The control system 50 of FIG. 4 is a state machine that transitions between a state 52, in which power is supplied through the bypass feed path 18, and a state 54, in which power is supplied through the inverter feed path 20. Based on the measurements of the UPS 12 discussed above, the UPS controller 16 may periodically check for power supply disturbances with a disturbance analyzer component 56. The disturbance analyzer component 56 may detect a variety of different types of potential power supply disturbances, as will be generally discussed in greater detail below with reference to FIG. 5. In addition, the disturbance analyzer component 56 may ascertain the severity of a power supply disturbance in certain cases. In general, the UPS controller 16 may carry out the components of the control system 50 periodically (e.g., every 100-200, μs or, in some cases, more often). Furthermore, each of the components of the control system 50 may be applied to parallel operation of multiple UPSs 12.

Because supplying power through the bypass feed path 18 is generally more efficient than through the inverter feed path 20, the default state of operation in the UPS control system 50 may be the state 52. A power supply disturbance could impact the load 14 through the bypass feed path 18, however, so the control system 50 may transition from the state 52 to the state 54 when the disturbance analyzer component 56 detects certain types of power supply disturbances (e.g., instantaneous voltage error, root mean squared voltage error, missing input phase, neutral current). Likewise, when operating in the state 54, the control system 50 may transition from the state 54 to the state 52 when the disturbance analyzer component 56 detects that the disturbance has ended or that certain other types of power supply disturbances have occurred (e.g., short-circuit). The disturbance analyzer component 56 of the UPS control system 50 may be run periodically (e.g., every 100 μs or so).

The modality of the transition from the state 52 to the state 54—that is, from supplying power through the bypass feed path 18 to supplying power through the inverter feed path 20—may vary depending on the disturbance that the UPS controller 16 has detected. In the example of FIG. 4, the UPS control system 50 includes transient inverter control components 58 and 60 to facilitate the transition from the state 52 to the state 54. In a transition from the state 52 to the state 54, the component 58 may include several subcomponents representing different modalities of transitions. For example, the component 58 of the transient inverter control of the UPS control system 50 may include a bypass SSM "kick" component 62, a soft transformer magnetization component 64, a transient stiffness reduction component 66, and a delay load share component 68. The transient modalities provided by these components should be understood as not necessarily mutually exclusive.

The bypass SSM "kick" component 62 may facilitate a very rapid transition from the bypass feed path 18 to the inverter feed path 20, and may include a "kick" of additional power of short duration to commutate the SSM 22 of the bypass feed path 18. Namely, in certain situations, the logic control signal $S_{BYP}$ may not suffice alone to switch off the power flowing through the SSM 22. The bypass SSM "kick" component 62 may force commutation of the SSM 22 using a "kick" of power back-fed into the bypass feed path 18. This "kick" may quickly shut off the SSM 22.

The soft transformer magnetization component 64 may facilitate a relatively gradual transition from the bypass feed path 18 to the inverter feed path 20 by softly magnetizing the output transformer 30 over a short period of time (e.g., 5 ms). The transient stiffness reduction component 66 may modify gains used for voltage control, reducing the bandwidth of the voltage control of the inverters 28 of the inverter feed paths 20. In certain specific cases, the transient stiffness reduction component 66 allows for smoother transitions from the bypass feed path 18 to the inverter feed path 20, particularly with well-damped transients. The delay load share component 68 may allow for smoother transitions from the bypass feed path 18 to the inverter feed path 20 in certain specific fault conditions. For example, load sharing may be delayed among parallel inverter feed paths 20 after certain fault conditions, such as an upstream fault. Delaying the load share may allow, for example, an SSM 22 with a short-circuited input feed path to be shut off using a "kick" of back-fed current.

Once the transition to state 54 has occurred, the disturbance analyzer component 56 may continue to run periodically. When the power supply disturbance condition that produced the transition to the state 54 has ended, the UPS control system 50 may transition from the state 54 back to the state 52. During such a transition, the component 60 of the transient inverter control of the UPS control system 50 may facilitate a gradual transition. Specifically, a soft transfer to bypass component 70 may cause the inverter feed path 20 and the bypass feed path 18 to share the load 14 in varying proportions. Specifically, the power supplied through the inverter feed path 20 may be reduced proportionally to the amount of power increasingly supplied by the bypass feed path 18.

Figure 5:
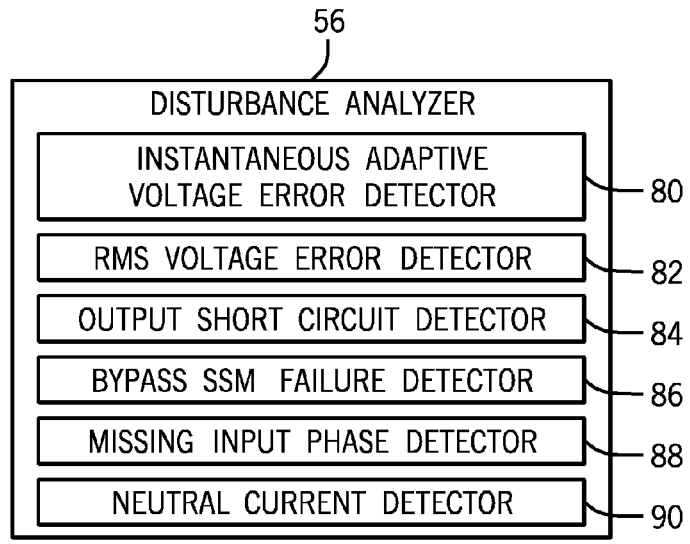
FIG. 5 is a block diagram of a disturbance analyzer component of the state machine of FIG. 4, in accordance with an embodiment.

The disturbance analyzer component 56 of the UPS controller 50 may include a variety of components to detect power supply disturbances that could arise. For example, as illustrated in FIG. 5, the disturbance analyzer component 56 may include an instantaneous adaptive voltage error detector component 80, root mean square (RMS) voltage error detector component 82, an output short circuit detector component 84, a bypass SSM failure detector component 86, a missing input phase detector component 88, and a neutral current detector component 90. The disturbance analyzer component 56 may include more or fewer such components to identify various types of power supply disturbances that could arise in the UPS system 10. That is, it should be understood that the components 80, 82, 84, 86, 88, and 90 are provided by way of example and are not intended to be exhaustive.

Generally speaking, the instantaneous adaptive voltage error detector component 80 may detect instantaneous voltage errors. An example of the instantaneous adaptive voltage error detector component 80 is described below with reference to FIGS. 6 and 7. The RMS voltage error detector component 82 may detect whether any of the three output phases has an RMS value that exceeds the specified limits over a given period of time. An example of the RMS voltage error detector component 82 is described below with reference to FIG. 8. The output short circuit detector 84 may identify short circuit conditions. An example of the output short circuit detector 84 is described below with reference to FIGS. 9 and 10. The bypass SSM failure detector component 86 of the disturbance analyzer components 56 may identify when a thyristor of an SSM 22 in a bypass feed path 18 has failed. An example of the bypass SSM failure detector component 86 is described below with reference to FIG. 11. The missing input phase detector component 88 may identify when RMS voltages of the three phases of the bypass feed path 18 fall beneath some specified threshold. An example of the missing input phase detector component 88 is described below with reference to FIG. 12. The neutral current detector 90 may identify the presence of a neutral current under a 3-wire scenario. An example of the neutral detector component 90 is described in greater detail below with reference to FIG. 13.

Figure 6:
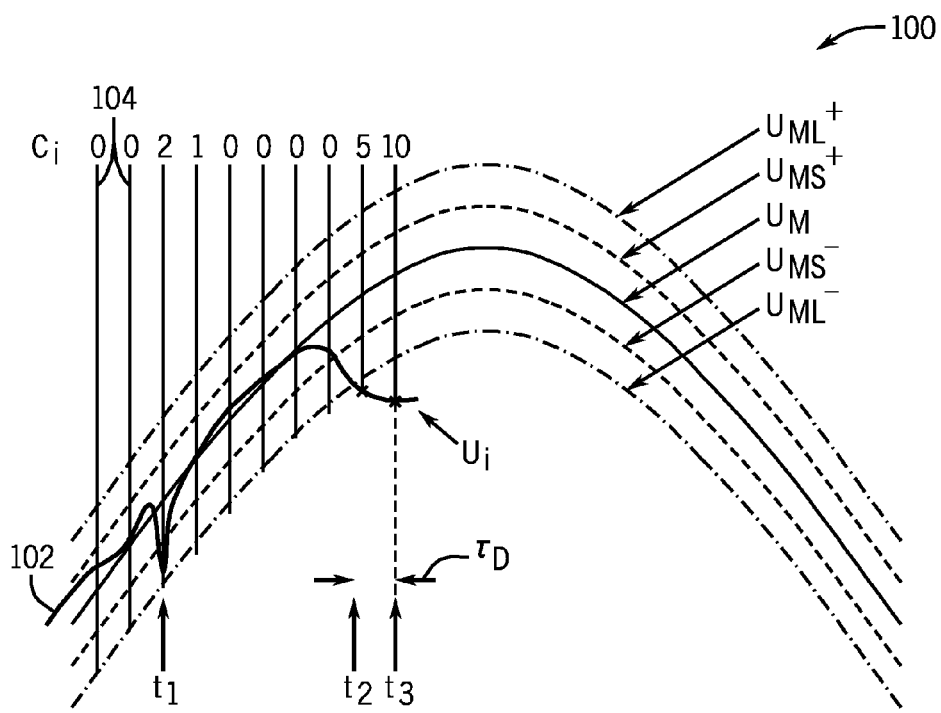
FIG. 6 is an illustration of an adaptive voltage error detector component of the disturbance analyzer component, in accordance with an embodiment.

As mentioned above, the instantaneous adaptive voltage error detector component 80 may identify instantaneous voltage errors at the output of the UPS 12 to the load 14. One example of the operation of the instantaneous adaptive voltage error detector component 80 appears in a voltage error diagram 100 of FIG. 6. In the voltage error diagram 100, an instantaneous voltage curve 102 is plotted over time against various instantaneous thresholds. In the example of FIG. 6, the instantaneous voltage thresholds include an ideal instantaneous voltage curve $U_M$. A range of acceptable instantaneous voltages falls between the instantaneous voltage curve $U_M$ and first upper and lower threshold instantaneous voltage curve $U_{MS+}$ and $U_{MS-}$. The instantaneous adaptive voltage error detector component 80 may not detect any error so long as the instantaneous voltage curve 102 remains within these thresholds. Additional threshold voltage curves, shown as $U_{ML+}$ and $U_{ML-}$ represent other thresholds that may be used to more quickly identify a voltage error. It should be understood that more or fewer threshold voltage curves may be employed.

A counter, illustrated in FIG. 6 as $C_i$, may add or subtract from a counting value depending on whether the instantaneous voltage curve 102 exceeds some instantaneous voltage curve threshold (e.g., $U_{MS+}$, $U_{ML+}$, $U_{MS-}$, or $U_{ML-}$). The variable i refers to phase of voltage being counted by the counter $C_i$. For example, the instantaneous voltage curve 102 is shown to fall beneath the threshold $U_{MS-}$ along test period 104 at time $t_1$. In the example of FIG. 6, a value of 2 may be added to the counter $C_i$ because the instantaneous voltage curve 102 is beyond the first threshold (e.g., $U_{MS-}$) but not the second threshold (e.g., $U_{ML-}$). At the subsequent test period 104, the counter $C_i$ may subtract a value of 1 because the instantaneous voltage curve 102 is not beyond any threshold. Likewise, at the subsequent test period 104, the counter $C_i$ may subtract another value of 1. At times $t_2$ and $t_3$, the instantaneous voltage curve 102 falls outside of the instantaneous voltage curve threshold $U_{ML-}$. Thus, for the test periods 104 at times $t_2$ and $t_3$, the counter $C_i$ may add a value of 5 each test period 104. As such, at the time $t_2$, the counter $C_i$ may hold a value of 5. The counter $C_i$ at $t_3$ may hold a value of 10. In the example of FIG. 6, the time difference $\tau_D$ between the times $t_2$ and $t_3$ may be approximately 100 μs. This time difference $\tau_D$ between may be selected as desired to be any suitable sampling value.

Figure 7:
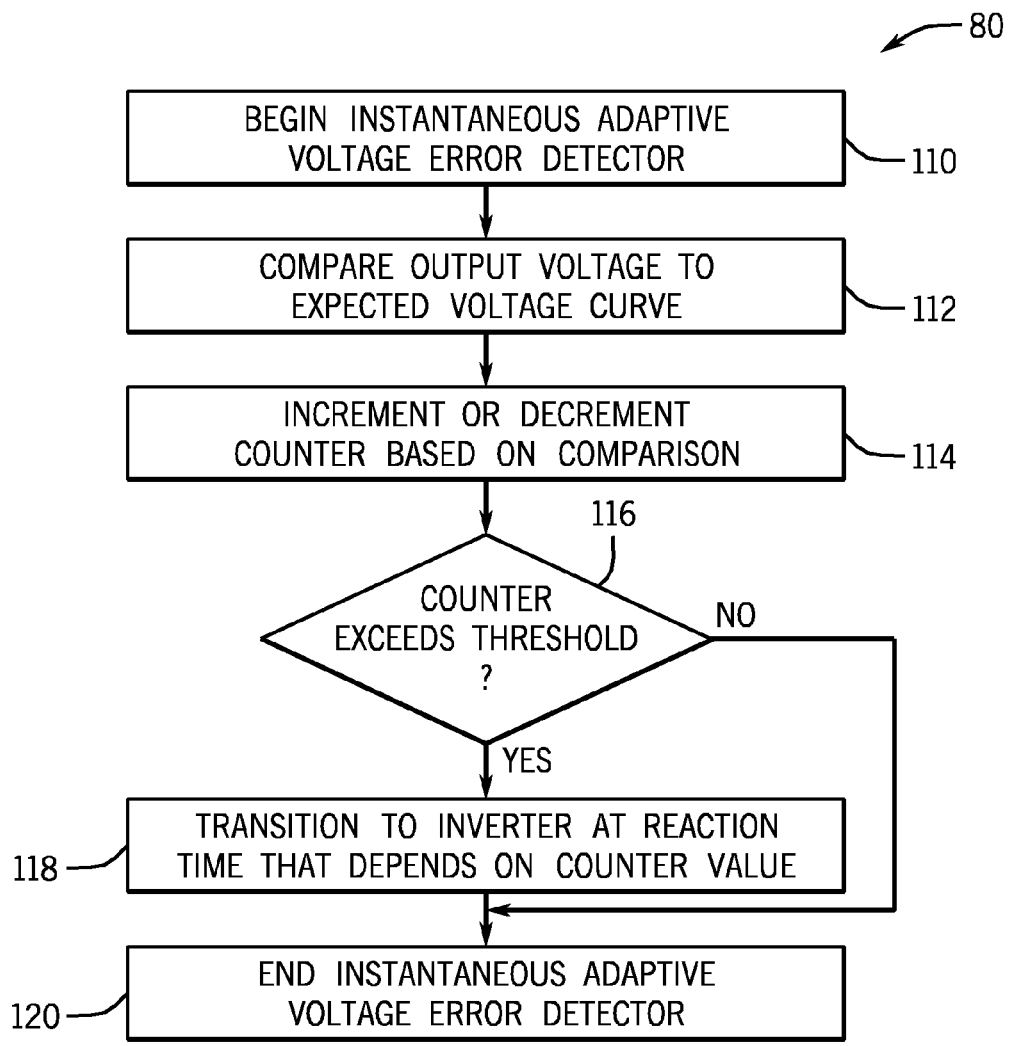
FIG. 7 is a flowchart of a method for carrying out an instantaneous adaptive voltage error detector component of the disturbance analyzer component, in accordance with an embodiment.

The instantaneous adaptive voltage error detector component 80 may identify an instantaneous voltage error when the counter $C_i$ exceeds some threshold, as generally illustrated in a flowchart of FIG. 7. The flowchart of FIG. 7 may begin when the UPS controller 16 carries out the instantaneous adaptive voltage error detector component 80 of the UPS control system 50 (block 110). The UPS controller 16 may compare the output voltage $U_o$ of each phase to the expected voltage threshold curves (e.g., $U_{MS+}$, $U_{ML+}$, $U_{MS-}$, and $U_{ML-}$) (block 112). Depending on the relationship of the output voltage $U_o$ to the expected voltage threshold, the UPS controller 16 may increment or decrement the counter $C_i$ (block 114).

When the counter $C_i$ exceeds some threshold (decision block 116), the UPS controller 16 may cause the UPSs 12 to transition from providing power via the bypass feed path 18 to supplying power via the inverter feed path 20 (block 118). In at least one example, this transition may occur more or less rapidly depending on the value of the counter $C_i$ (e.g., a higher value of the counter $C_i$ may call for a faster transition). Additionally or alternatively, a different transient modality may be selected (e.g., a different component 62, 64, 66, and/or 68) based on the apparent severity of the instantaneous adaptive voltage error detected (e.g., the size of the counter $C_i$ value). Afterward, or if the counter $C_i$ does not exceed the threshold (block 116), the UPS controller 16 may end the adaptive voltage error detector component 80 (block 120).

Figure 8:
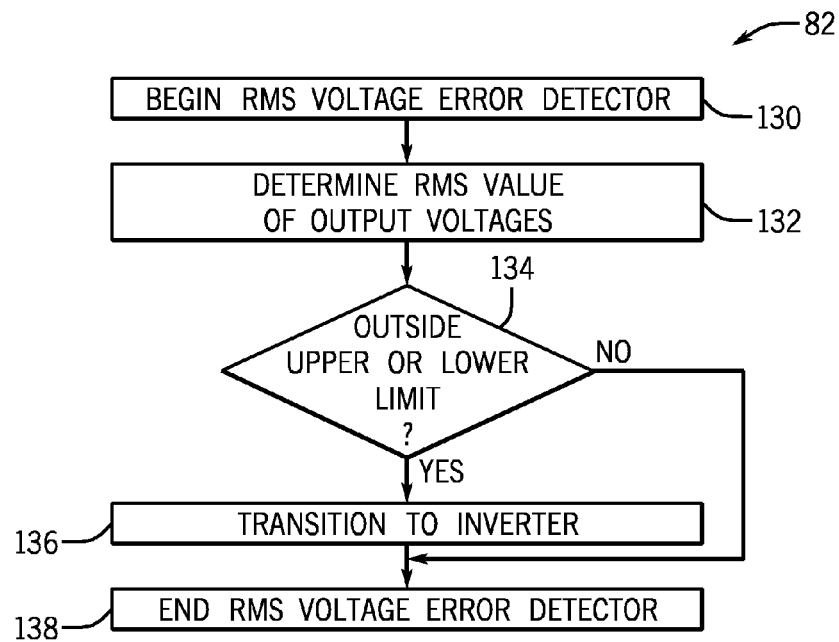
FIG. 8 is a flowchart of a method for carrying out an RMS voltage error detector component of the disturbance analyzer component, in accordance with an embodiment.

A method to carry out the root means square (RMS) voltage error detector component 82 appears in a flowchart of FIG. 8. The flowchart of FIG. 8 may begin when the UPS controller 16 runs the RMS voltage error detector component 82 (block 130). The UPS controller 50 may determine the root means square (RMS) values of the output voltages $U_o$ (block 132). To do so, the UPS controller 16 may conduct a sliding RMS computation using instantaneous and historical values of the output voltage $U_o$ (e.g., every 100 or 200 μs, or so) (block 132).

If the RMS value of the output voltage $U_o$ exceeds some upper or lower limit for some period of time (decision block 134), the UPS controller 16 may cause the UPSs 12 to transition from the inverter feed path(s) 20 to the bypass feed path(s) 18 (block 136). The severity of the RMS voltage error may inform which transient modality of the transient inverter control component 58 is used (e.g., component 62, 64, 66, and/or 68). Afterward, or if the RMS value of the output voltage $U_o$ is within the upper and lower limits (decision block 134), the UPS controller 16 may end the RMS voltage error detector component 82 (block 138).

Figure 9:
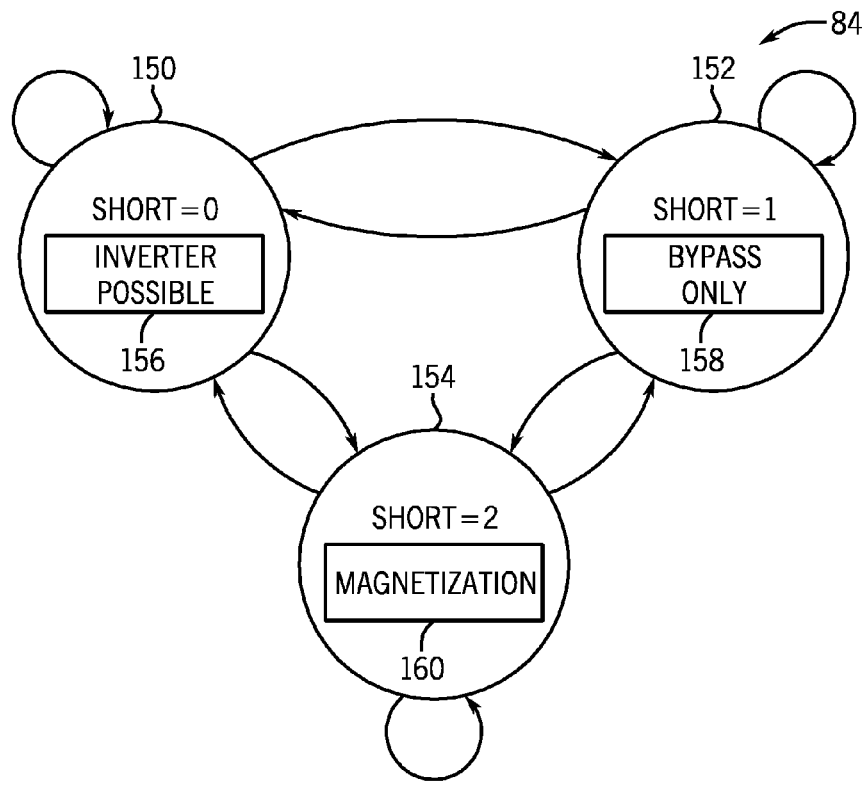
FIG. 9 is a block diagram of a short-circuit detection component of the disturbance analyzer component, in accordance with an embodiment.

The output short circuit detector component 84 may operate as a state machine as generally illustrated in FIG. 9. In the example of FIG. 9, the state machine of the output short circuit detector component 84 includes three states: a state 150 (SHORT=0), a state 152 (SHORT=1), and a state 154 (SHORT=2). In the example of FIG. 9, the first state 150 generally indicates that no short circuit is present. Thus, in the first state 150, the UPS controller 16 may be permitted to control the UPSs 12 to provide power through the bypass feed path 18 and/or the inverter feed path 20 (block 156). The second state 152 represents a time in which a short circuit condition has been identified. Under such conditions, the UPS controller 16 may be permitted only to supply power via the bypass feed path 18 (block 158). When a short circuit condition has been detected, it is believed that the utility power supply (e.g., power supplied through the bypass feed path 18) may better withstand a short circuit. The third state 154 represents a state after a short circuit has been identified and has lasted beyond some threshold amount of time. In this third state 154, the output transformer 30 may be assumed to have lost a relevant amount of energy, and therefore to benefit from re-magnetization. During the third state 154, the UPS controller 16 may control the bypass feed path 18 and the inverter feed path 20 in a manner such that the output transformer 30 becomes re-magnetized, as generally illustrated in block 160. Magnetizing the output transformer 30 in the state 154 may facilitate a transition back to the state 150 to supply power via the inverter feed path 20, if desired.

Figure 10:
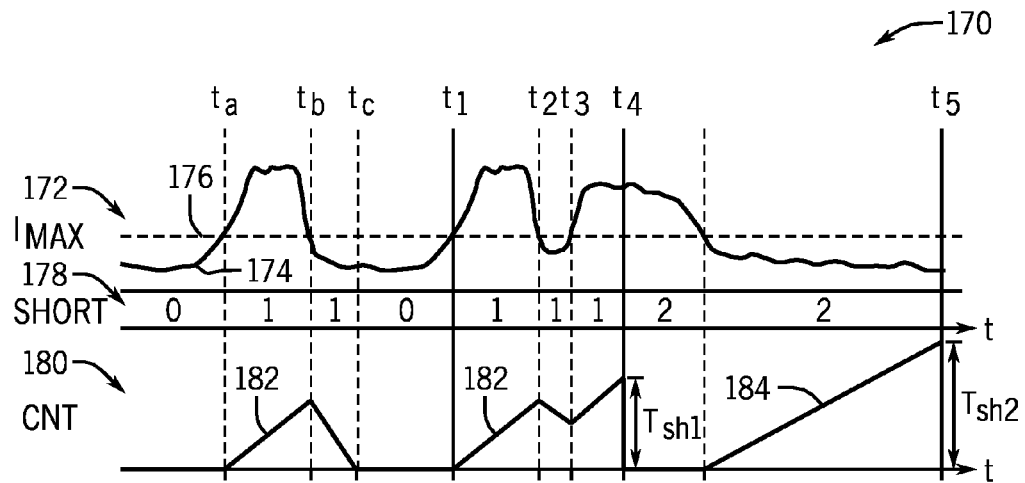
FIG. 10 is a timing diagram illustrating one example of the short-circuit detection component in action, in accordance with an embodiment.

A timing diagram 170, shown in FIG. 10, provides one example of the operation of the output short circuit detector component 84 of FIG. 9. In the timing diagram 170 of FIG. 10, current 172 is plotted as an instantaneous current curve 174 relative to a maximum allowable current 176. The current state of the output short circuit detector component 84 appears at numeral 178. A counter of the output short circuit detector 84 appears at numeral 180. As can be seen in FIG. 10, the instantaneous output current curve 174 may at times cross the threshold of the maximum allowable current 176. In the example of FIG. 10, the output current 174 exceeds the maximum current threshold 176 at times $t_a$, $t_1$, and $t_3$.

At the outset of the timing diagram 170, the output short circuit detector component 84 may be in the first state 152 (SHORT=0). At time $t_a$, when the output curve 174 crosses the maximum allowable current threshold 176, the output short circuit detector component 84 may transition to the second state 152 (SHORT=1). While the output short circuit detector component 84 is in the second state 152 (SHORT=1), a timing counter may be incremented, illustrated in FIG. 10 as an incrementing curve 182. In the example of FIG. 10, the counter 180 may increase linearly while the output short circuit detector component 84 is in the second state 152 (SHORT=1). Meanwhile, the counter 180 may decrease linearly when the output curve 174 no longer exceeds the maximum allowable threshold 176. In other examples, the counter 180 may increase or decrease non-linearly and/or the magnitude of such changes may vary over time. Further, the counter 180 may increment and decrement at different rates. In FIG. 10, for example, the counter 180 decrements more quickly than the counter 180 increments.

When the value of the counter 180 returns to be at or below some value (e.g., 0), the output short circuit detector component 84 return to the first state 150 (SHORT=0). Thus, the output short circuit detector component 84 may return to the first state 150 (SHORT=0) after the counter decrements back to 0 as the current between times $t_b$ and $t_c$ no longer exceeds the maximum allowable threshold. While in the first state 150 (SHORT=0), the counter 180 may neither decrement nor increment.

At time $t_1$, when the output curve 174 crosses the maximum allowable current threshold 176 again, the output short circuit detector component 84 may transition once more to the second state 152 (SHORT=1). While the output short circuit detector component 84 is in the second state 152 (SHORT=1), the timing counter 180 may be incremented again, as shown at second numeral 182. Likewise, between times $t_2$ and $t_3$, the counter 180 may decrement as the output curve 174 no longer exceeds the maximum allowable threshold 176. When the cumulative count 180 exceeds some first threshold $T_{SH1}$ (e.g., at time $t_4$) the output short circuit detector component 84 may transition from the second state 152 (SHORT=1) to the third state 154 (SHORT=2). In the timing diagram 170, this transition occurs at time $t_4$. From time $t_4$ to $t_5$, the output short circuit detector 84 is in the third state 154

(SHORT=2). It may be recalled that the UPS controller 16 may control the UPSs 12 to magnetize the output transformer during the third state 154 (SHORT=2). When the output current curve 174 falls back below the maximum current, the counter 180 may begin a new count, as illustrated by an incrementing curve 184. When the new count exceeds a second threshold (e.g., $T_{SH2}$), the output short circuit detector 84 may transition back to the first state 150 (SHORT=0), indicating that now either the bypass feed path 18 or the inverter feed path 20 may be employed to supply power to the load 14.

Figure 11:
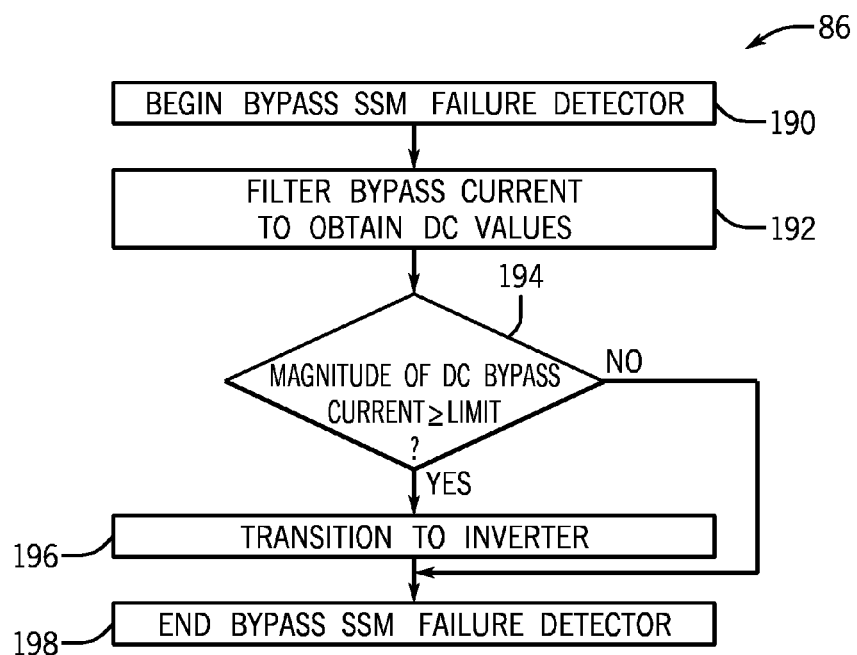
FIG. 11 is a flowchart of a method for carrying out a bypass static switch module (SSM) failure detector component of the disturbance analyzer component, in accordance with an embodiment.

The bypass SSM failure detector component 86 may be carried out in a manner illustrated in FIG. 11. In particular, FIG. 11 presents a flowchart that begins when the UPS controller 16 executes the bypass SSM failure detector component 86 (block 190). The UPS controller 16 may filter the bypass current $I_b$ values to obtain direct current (DC) values (block 192). Since the DC values should ideally approach 0V, if the magnitudes of these DC values exceed some limit (decision block 194), the UPS controller 16 may control the UPSs 12 to transition to supply power via the inverter feed path 20 rather than the bypass feed path 18 (block 196). Additionally or alternatively, the UPS controller 16 may generate an alarm associated with this power supply disturbance condition. Thereafter, or if the direct current values of the bypass current $I_b$ does not exceed a limit (decision block 194), the UPS controller 16 may end the bypass SSM failure detector component 86 (block 198).

Figure 12:
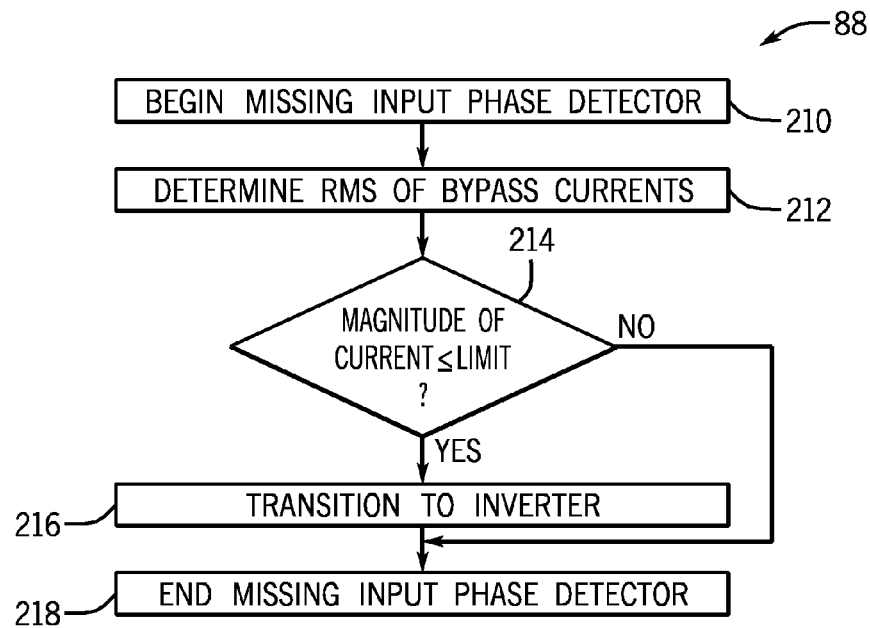
FIG. 12 is a flowchart describing a method for carrying out a missing input phase detector component of the disturbance analyzer component, in accordance with an embodiment.

The UPS controller 16 may carry out the missing input phase detector component 88 as generally illustrated by a flowchart of FIG. 12. The flowchart of FIG. 12 may begin when the UPS controller 16 begins to carry out the missing input phase detector component 88 (block 210). The UPS controller 16 may determine a root mean squared (RMS) value of the bypass feed path 18 currents $I_b$ (block 212). If the magnitude of any phases of these RMS values falls beneath some limit for some period of time (decision block 214), it may be understood that the current is not being supplied by the power source (e.g., the utility power grid). Thus, under these conditions, the UPS controller 16 may control the UPSs 12 to supply power to the load 14 via the inverter feed path 20 rather than the bypass feed path 18 (block 216). Additionally or alternatively, the UPS controller 16 may generate an alarm associated with this power supply disturbance condition. Depending on the bypass input voltage being in or out of tolerances, the disturbance may be understood to relate to a failure of a phase in the SSM 22 (e.g., a pair of anti-parallel thyristors not in conduction) or effectively result from a missing input phase, respectively. The UPS controller 16 may further discriminate between the two by comparing the bypass voltage RMS with specified thresholds. Thereafter, or if the RMS values of the bypass currents $I_b$ are within the limit (decision block 214), the UPS controller may end the missing input phase detector component 88 (block 218).

Figure 13:
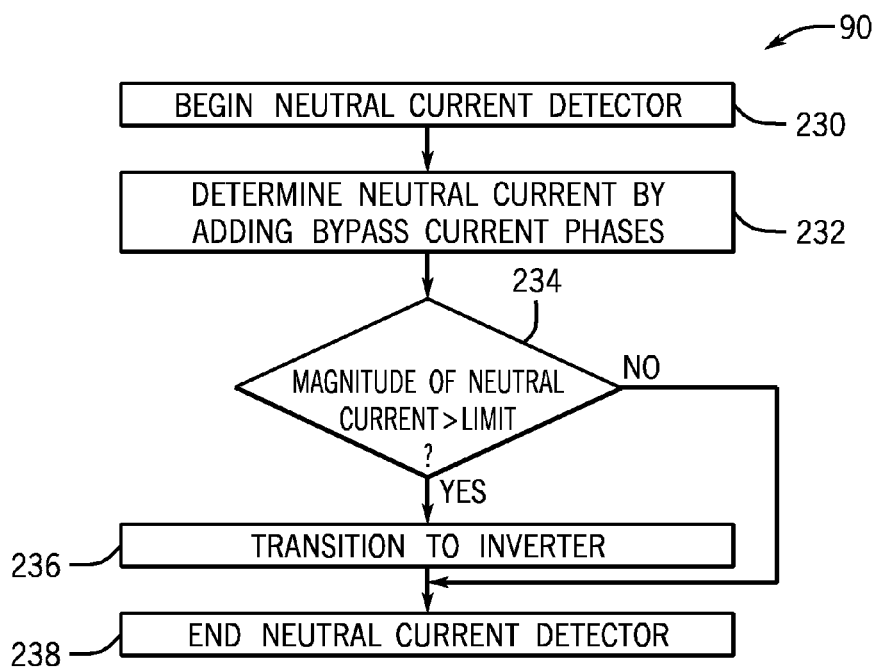
FIG. 13 is a flowchart describing a method for carrying out a neutral current detector component of the disturbance analyzer component, in accordance with an embodiment.

FIG. 13 illustrates a flowchart representing the operation of the neutral current detector component 90. The flowchart of FIG. 13 may begin when the UPS controller 16 begins to run the neutral current detector component 90 (block 230). In particular, the UPS controller 16 may determine a total neutral current by adding the various phases of the bypass feed path 18 current $I_b$ (block 232). In particular, it may be appreciated that when 3-wire operation is employed and the output neutral line is bonded to the ground, any neutral current will produce a ground current. This ground current may be due to a zero-sequence component in the bypass feed path 18 input voltages for imbalances in the inverter 28 filter impedances. If the magnitude of the neutral current exceeds some limit (block 234), the UPS controller 16 may control the UPSs 12 to supply power via the inverter feed path 20 rather than the bypass feed path 18 (block 236). Additionally or alternatively, the UPS controller 16 may generate an alarm associated with this power supply disturbance condition. Otherwise or thereafter, the UPS controller 16 may end its execution of the neutral current detector component 90 (block 238).

When the UPS controller 16 elects to transition power supply in the inverter feed path 20 to the bypass feed path 18, the transition may occur according to several different transient modalities. For instance, depending on the type and/or severity of the power supply disturbance detected by the disturbance analyzer component 56, the UPS controller 16 may cause the transition to occur via the bypass SSM "kick" component 62, the soft transformer magnetization component 64, the transient stiffness reduction component 66, and/or the delay load share component 68.

Figure 14:
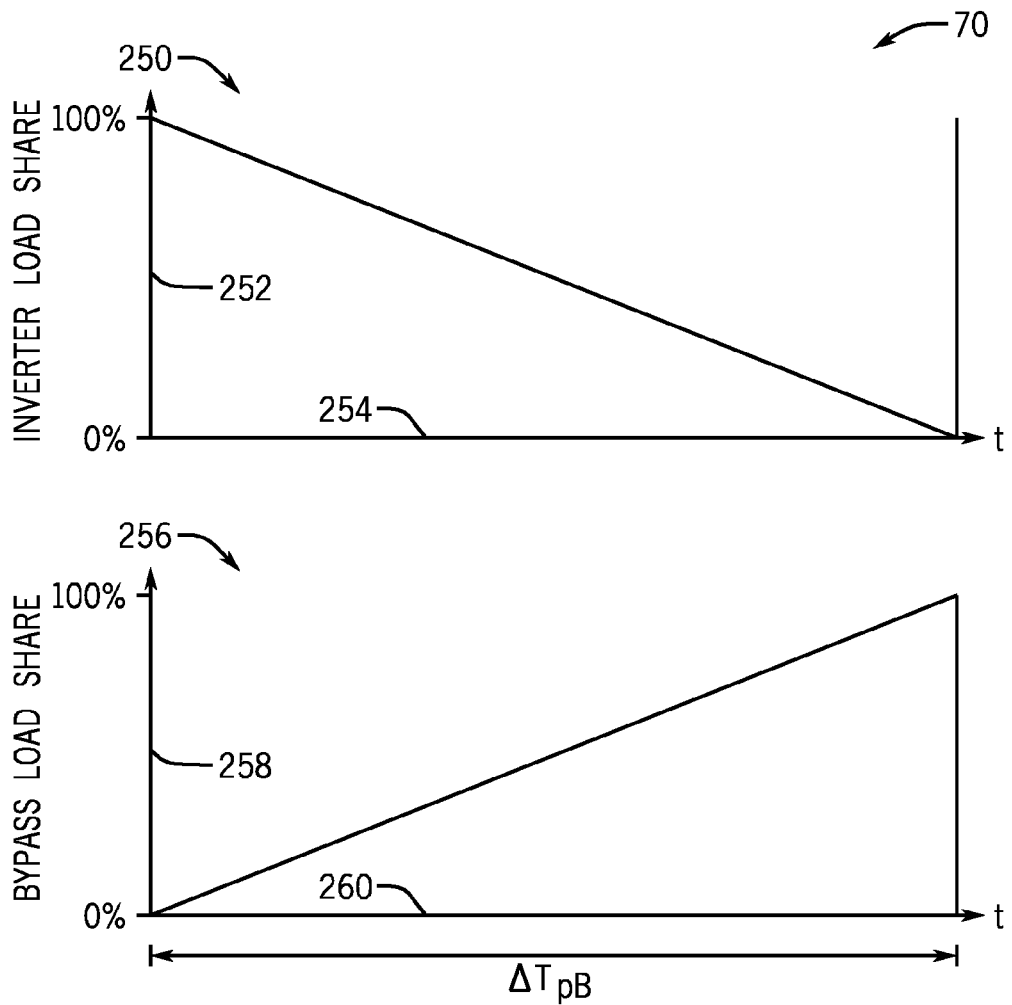
FIG. 14 is a timing diagram of an example of a soft transfer to from double-conversion to bypass, in accordance with an embodiment.

FIG. 14 provides a series of timing diagrams that illustrate a manner of carrying out the soft transfer to bypass component 70. In the example of FIG. 14, a first load share plot 250 represents a percentage of the load supplied by the inverter feed path 20 over time. The inverter load share plot 250 includes an ordinate 252 representing the share of the load carried by the inverter feed path(s) 20 from 0% to 100%. An ordinate 254 of the plot 250 represents time. Similarly, a bypass load share plot 256 represents the share of power supplied by the bypass feed path(s) 18 over the same period of time. An ordinate 258 of the plot 256 represents the share of the power supply to the load 14 by the bypass feed path 18 from 0% to 100%. An abscissa 260 of the plot 256 represents time.

As illustrated in FIG. 14, over a period of time $\Delta T_{pB}$, representing a soft-transfer-to-bypass time, the share of the load provided by the inverter feed path 20 decreases linearly from 100% to 0%, while the share of the load provided by the bypass feed path 18 increases linearly from 0% to 100%. It should be appreciated that, in alternate embodiments, any other suitable functions may be employed such that the sum of the power supplied by the inverter feed path 20 and the bypass feed path 18 total to 100% at any given time. For instance, exponential and/or logarithmic functions may be employed instead of linear functions. In any case, the transition between supplying power through the inverter feed path 20 to supplying power through the bypass feed path(s) 18 may occur in a sufficiently gradual time so as to maintain a smooth operation of the load 14. The soft transfer to bypass component 70 may be particularly useful when the power supplied over the bypass feed path 18 is weak. Under such conditions, the soft transfer to bypass component 70 may prevent oscillations of the output voltage at the load 14 from occurring as a result of the otherwise step-load-change from being applied to the impedance of the circuitry (e.g., which serves as an LC circuit).

Figure 15:
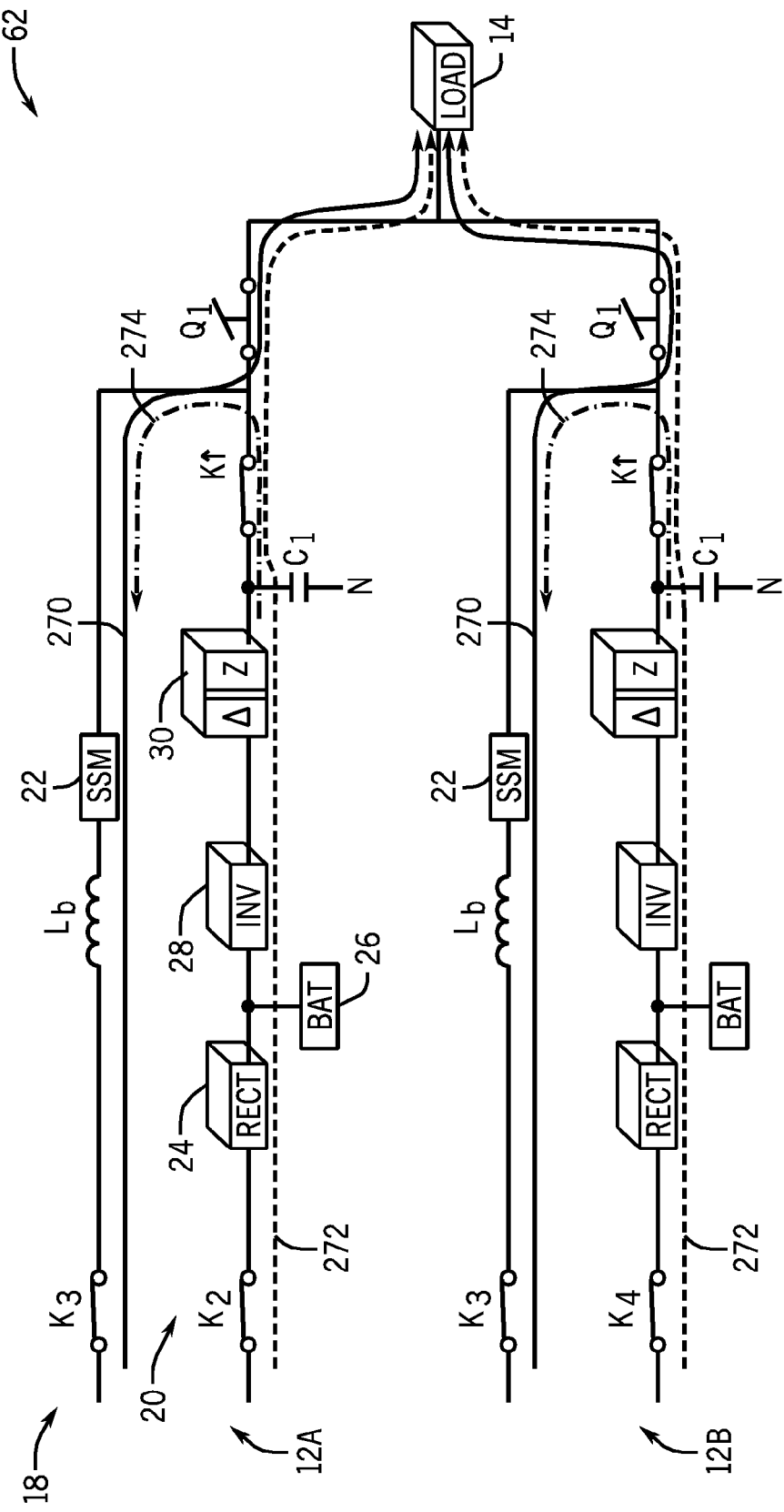
FIG. 15 is a block diagram illustrating a bypass SSM "kick" operation in the system of parallel UPSs, in accordance with an embodiment.

As discussed above, when transitioning from supplying power via the bypass feed path(s) 18 to the inverter feed path(s) 20, differing conditions may warrant different transient modalities. In some cases, the thyristors of the static switch module (SSM) 22 of the bypass feed path(s) 18 may remain open for a short period of time without additional measures to force the SSM 22 open. Under such conditions, the UPS controller 16 may carry out the bypass SSM "kick" component 62, as generally illustrated in FIG. 15. In the example of FIG. 15, bypass power 270 is shown to be supplied through the bypass feed path 18 of two parallel UPS 12A and 12B. When a power supply disturbance occurs that prevents the SSMs 22 from turning off sufficiently quickly, the UPS controller 16 may cause the inverter feed path(s) 20 to supply inverter power 272 in a manner that forces off the SSMs. When such a "kick" is called for to force the commutation, or switching off, of the bypass feed path 18, the available inverter feed path 20 are commanded to reverse the total current flowing through the active bypass feed path(s) 18. To do so, the UPS controller 16 may adjust the load share of the UPSs 12A and 12B and control the inverters 28 in such a manner to generate a "kick" over a period of approximately 2-3 ms. Namely, the control of the inverters 28 may be modified using an additional feedforward term that is active for a specific time $\Delta T_k$ (e.g., approximately 2-3 ms). This additional feedforward term may be equal to the total bypass feed path 18 current vector $I_b$ multiplied by a complex gain $K_b e^{j\Phi B}$. The term $\phi B$ is fixed to have $\arg(U_o)=\arg(I_b)$, where $U_o$ is the output voltage resulting from the command voltage $U_{cm}=I_b K_b e^{j\Phi B}$. Within the "kicking zone" of $\Delta T_k$, the feedforward action for every phase may disappear automatically as soon as the relative SSMs 22 switch off from the "kick".

Figure 16:
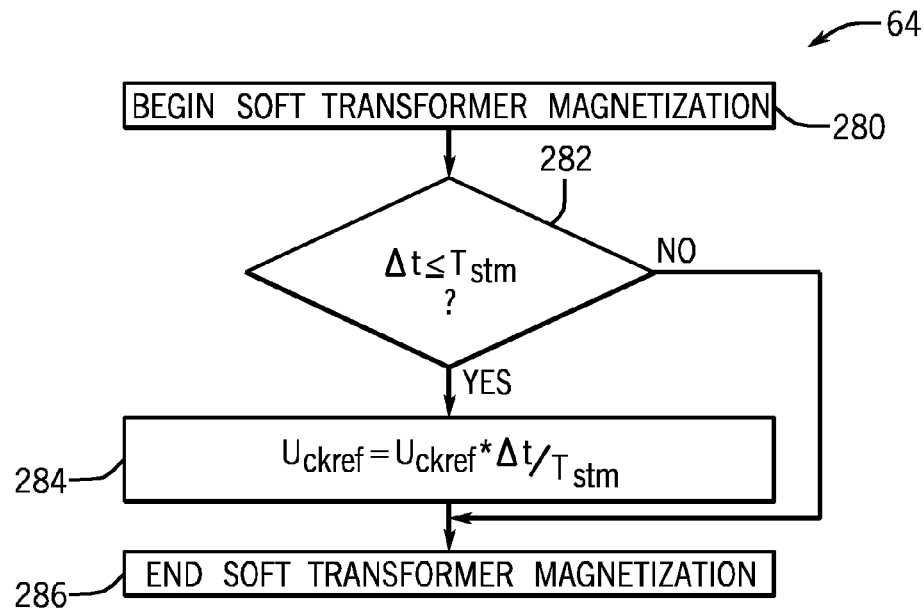
FIG. 16 is a flowchart of a method for soft transformer magnetization, in accordance with an embodiment.

When the power supply disturbance detected by the disturbance analyzer component 56 of the UPS control system 50 is such that the output transformer 30 may have lost significant energy, the transient modality from the bypass feed path 18 to the inverter feed path 20 may allow for soft transformer magnetization. Under such conditions, the UPS controller 16 may carry out the soft transformer magnetization component 64 as illustrated in FIG. 16. When the UPS controller 16 begins to carry out the soft transformer magnetization component 64 (block 280), the UPS controller 16 may determine whether the elapsed time from the discovery of the power supply disturbance using the disturbance analyzer component 56 is less than a total soft transformer magnetization time $T_{stm}$ (decision block 282). When this condition is true, the UPS controller 16 may control the inverters 28 and share the load between the inverter feed path(s) 20 and the bypass feed path(s) 18 in a manner consistent with the control output reference voltages of block 284. In the example of FIG. 16, over a time $T_{stm}$, these reference voltage values $U_{ckref}$ are ramped up linearly from zero to the normal reference values employed to control the inverters 28. Although the example of FIG. 16 involves linearly varying the reference values to support a linear transition to softly magnetize the output transformers 30, to generally minimize the impact of the transition on the load 14, any other suitable functions may be employed. For instance, in other examples, the reference values $U_{ckref}$ may be increased from zero to the normal reference values exponentially or according to any other suitable function. After block 284, the UPS controller 16 may end the soft transformer magnetization component 64 (block 286).

Figure 17:
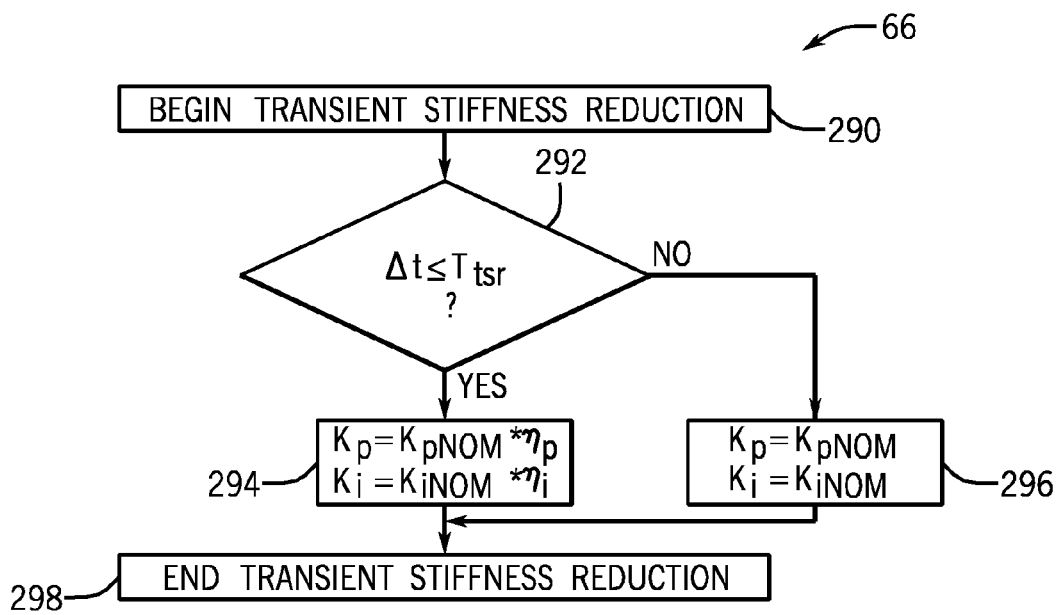
FIG. 17 is a flowchart of a method for transient stiffness reduction, in accordance with an embodiment.

Additionally or alternatively, the UPS controller 16 may carry out the transient stiffness reduction component 66 to reduce the stiffness of the UPS controlled by modifying the control gain for controlling the inverters 28. In particular, as illustrated in FIG. 17, the UPS controller 16 may begin to carry out the transient stiffness reduction component 66 (block 290) by determining whether the time $\Delta t$ since the start of the transition from the bypass feed path 18 to the inverter feed path 20 is less than or equal to some transient stiffness reduction period $T_{tsr}$ (decision block 292). As long as this condition is true, the load sharing and inverter 28 control may employ modified control gains $K_p$ and/or $K_i$ (block 294). In particular, over the specific time $T_{tsr}$, the current feedback gains $K_i$ and voltage feedback gain $K_p$ may be reduced by factors $(1-\eta_i$ and $1-\eta_p)$, respectively. Otherwise, the control gains $K_p$ and $K_i$ may remain at normal levels (block 296). The UPS controller 16 thereafter may end the transient stiffness reduction component 66 (block 298). In specific cases, in particular those with well-damped transients, the transient stiffness reduction component 66 allows for smoother transitions from the bypass feed path 18 to the inverter feed path 20.

Technical effects of the present disclosure include, among other things, improved transitions between supply power through a bypass feed path or an inverter feed path of an uninterruptable power supply (UPS). In particular, by tailoring the transient modalities upon a transfer from the bypass feed path to the inverter feed path, and vice/versa, the high-efficiency provided by the bypass feed path 18 may be employed without sacrificing the high level of protection provided by the inverter feed path of UPS.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An uninterruptible power supply system comprising:
   a first inverter feed path comprising a rectifier in series with an inverter to supply a first amount of power to a load based at least in part on a first plurality of commands;
   a first bypass feed path in parallel with the inverter feed path to supply a second amount of power to the load based at least in part on a second plurality of commands; and
   a controller configured to identify an occurrence and type of a power supply disturbance and to generate the first and second pluralities of commands to vary the first amount of power and the second amount of power based at least in part on an occurrence of an identified power supply disturbance and an identified type of the identified power supply disturbance, wherein the identified power supply disturbance comprises an output current, wherein the controller is configured to:
      when the output current of the uninterruptible power supply system exceeds a limit, allow the first bypass feed path to supply power to the load;
      increment a first counter while the output current of the uninterruptible power supply system exceeds the limit;
      decrement the first counter while the output current does not exceed the limit; and
      when the first counter has been decremented to a particular value or less, allow the first bypass feed path or the first inverter feed path, or both, to supply power to the load.

2. The system of claim 1, wherein the first inverter feed path comprises an output transformer in series with the rectifier and inverter, wherein the controller is configured to control the first bypass feed path or the first inverter feed path, or both, such that when the first inverter feed path substantially does not supply power to the load, the output transformer is magnetized by power back-fed from the first bypass feed path into the first inverter feed path.

3. The system of claim 1, wherein the controller is configured to detect the occurrence of one or more power supply disturbances of a set of identifiable types of power supply disturbances, wherein the set of identifiable types of power supply disturbances comprises an instantaneous voltage error, an RMS voltage error, an output short circuit, a failure of a static switch module of the first bypass feed path, a missing input phase, and a neutral current.

4. The system of claim 1, wherein the controller is configured to generate the first and second pluralities of commands such that, following the occurrence of the power supply disturbance, the first amount of power increases and the second amount of power decreases at corresponding rates that depend on a severity of the power supply disturbance.

5. The system of claim 1, wherein the controller is configured to generate the first and second pluralities of commands such that, following the occurrence of the power supply disturbance, the first amount of power increases and the second amount of power decreases at corresponding rates that depend on the type of the power supply disturbance.

6. The system of claim 1, wherein the controller is configured to generate the first and second pluralities of commands such that, following the occurrence of the power supply disturbance, the second amount of power is reduced to substantially zero and the first amount of power is temporarily increased to an amount sufficient to cause a static switch module of the bypass feed path to be forced off with back-fed power through the bypass feed path.

7. The system of claim 1, wherein the controller is configured to generate the first and second pluralities of commands such that, following the occurrence of the power supply disturbance, the first amount of power increases to softly remagnetize an output transformer of the first inverter feed path.

8. The system of claim 1, wherein the controller is configured to generate the first and second pluralities of commands, following the occurrence of the power supply disturbance, at least in part by decreasing control gains associated with the control of the first inverter feed path component to nominal values over a period time to reduce transient stiffness in the inverter feed path.

9. An uninterruptible power supply system comprising:
a first inverter feed path comprising a rectifier in series with an inverter to supply a first amount of power to a load based at least in part on a first plurality of commands;
a first bypass feed path in parallel with the inverter feed path to supply a second amount of power to the load based at least in part on a second plurality of commands, wherein the first bypass feed path comprises an inductor in series with a static switch module and wherein the controller is configured to identify the occurrence of the power supply disturbance based at least in part on current sensor and voltage sensor measurements on the first bypass feed path that are obtained before the inductor; and
a controller configured to generate the first and second pluralities of commands to vary the first amount of power and the second amount of power based at least in part on an occurrence of a power supply disturbance and a type or severity, or both, of the power supply disturbance.

10. An article of manufacture comprising:
one or more tangible, non-transitory machine-readable media at least collectively comprising machine-executable instructions, the instructions comprising:
instructions to run a disturbance analyzer component of an uninterruptible power supply control system to identify at least two types of power supply disturbances and to determine when at least one of the at least two identified types of identified power supply disturbances occurs in the uninterruptible power supply, wherein the instructions to run the disturbance analyzer comprise instructions to run an instantaneous voltage error detection component, wherein the instructions to run an instantaneous voltage error detection component comprise instructions to:
compare a measured instantaneous output voltage of the uninterruptible power supply with an expected instantaneous output voltage;
when the measured voltage differs from the expected voltage by more than a first threshold but less than a second threshold, increment a counter by a first added value;
when the measured voltage differs from the expected voltage by more than the second threshold, increment the counter by a second added value, wherein the second added value is greater than the first added value;
when the measured voltage differs from the expected voltage by less than the first threshold, decrement the counter by a subtracted value; and
when the counter holds a value that exceeds a counter threshold, determine that an instantaneous voltage error has occurred;
instructions to cause one or more bypass feed paths or one or more inverter feed paths to primarily supply power through the uninterruptible power supply depending on whether the at least one of the at least two identified types of identified power supply disturbances has occurred in the uninterruptible power supply; and
instructions to run a transient control component of the uninterruptible power supply control system to control a transient modality by which a transition from supplying power from the one or more bypass feed paths to the one or more inverter feed paths or from the one or more bypass feed paths to the one or more inverter feed paths occurs when such a transition occurs.

11. The article of manufacture of claim 10, wherein the instructions to run the disturbance analyzer comprise instructions to run an instantaneous voltage error detection component configured to determine whether an instantaneous voltage error has occurred and, when the instantaneous voltage error has occurred, a severity of the instantaneous voltage error.

12. The article of manufacture of claim 10, wherein the instructions to run the instantaneous voltage error detection component comprise instructions, when the counter holds the value that exceeds a counter threshold, to determine a severity of the instantaneous voltage error based at least in part on the value held by the counter, wherein the instructions to run the transient control component comprise instructions to vary the transient modality based at least in part on the severity of the instantaneous voltage error.

13. The article of manufacture of claim 10, wherein the instructions to run the disturbance analyzer comprise instructions to run:
a root mean squared voltage error detector component that compares a root mean squared value of an output voltage of the uninterruptible power supply to upper and lower root mean squared limits;
a static switch module failure detector that compares a direct current value of current through the one or more bypass feed paths with a bypass direct current limit;
a missing input phase detector that compares a root mean squared value of the current through the one or more bypass feed paths with upper and lower bypass root mean squared current limits; or
a neutral current detector that compares a sum of all phases of the current through the one or more bypass feed paths with an upper limit; or
any combination thereof.

14. The article of manufacture of claim 10, wherein the instructions to run the disturbance analyzer component comprise instructions to run a short circuit detection component, wherein the instructions to run the short circuit detection component comprise instructions to:
when an output current of the uninterruptible power supply exceeds a limit, allow only the bypass feed paths to supply power to the load;
increment a first counter while the output current of the uninterruptible power supply exceeds the limit;
decrement the first counter while the output current does not exceed the limit;
once the first counter crosses a first threshold:
increment a second counter while the output current does not exceed the limit; and
decrement the second counter while the output current exceeds the limit; and
when the second counter crosses a second threshold, allow the bypass feed paths or the inverter feed paths, or both, to supply power to the load after re-magnetizing output transformers of the inverter feed paths.

15. The article of manufacture of claim 10, wherein the instructions to run the transient control component comprise instructions to steadily reduce power supplied by the bypass feed path while steadily increasing power supplied by the inverter feed path.

16. A method comprising:
supplying power to a load through a bypass feed path of an uninterruptible power supply;
identifying a first type of power supply disturbance and a second type of power supply disturbance possibly occurring in the uninterruptible power supply;
ascertaining that the first identified type of power supply disturbance or that the second identified type of power supply disturbance is occurring in the uninterruptible power supply;
transitioning to supplying power to the load through an inverter feed path of the uninterruptible power supply rather than the bypass feed path according to a first transient modality when the first identified type of power supply disturbance is occurring and according to a second transient modality when the second identified type of power supply disturbance is occurring;
when an output current of the uninterruptible power supply exceeds a limit, allowing only the bypass feed path to supply power to the load;
incrementing a first counter while the output current of the uninterruptible power supply exceeds the limit;
decrementing the first counter while the output current does not exceed the limit; and
when the first counter has been decremented to a particular value or less, allowing the bypass feed path or the inverter feed path, or both, to supply power to the load.

17. The method of claim 16, wherein the first power supply disturbance and the second power supply disturbance respectively comprise a different one of the following power supply disturbances: an instantaneous voltage error, a root mean square output voltage error, an output short circuit, a failure of a static switch module of the bypass feed path, a missing input phase of the bypass feed path, or a neutral current.

18. The method of claim 16, wherein the first transient modality and the second transient modality respectively comprise a different one of the following transient modalities: a forced commutation of a static switch module of the bypass feed path, a soft magnetization of an output transformer of the inverter feed path, a transition with reduced transient stiffness, or a transition with delayed load sharing.

* * * * *